INVENTOR.
FRANK V. MALIK
BY
Kenway, Jenney & Hildreth

United States Patent Office 3,458,376
Patented July 29, 1969

3,458,376
PROCESS FOR LAMINATING HIDES WITH FOIL
Frank V. Malik, Magnolia, Mass.
(28 Varney St., Salem, Mass. 01970)
Filed Apr. 19, 1966, Ser. No. 543,619
Int. Cl. B44c *1/14;* B44b *5/00*
U.S. Cl. 156—233             5 Claims

ABSTRACT OF THE DISCLOSURE

A first carrier web or belt carrying leather pieces which are coated with adhesive, is fed to an embossing press. A second carrier web or belt having a metallic foil detachably adhered to one side is fed to the press. Within the press the metal foil is forcibly brought in contact with the adhesive coated side of the leather and adheres thereto. At the same time the leather is embossed. At the exit side of the press, the two carrier webs are separated on divergent paths. As they do, the foil adhering to the leather is pulled loose from the original foil so as to remain on the leather. Suitable reeling devices wind up the respective carriers.

---

This invention relates to an improved process for laminating foil with hides as a surface decorating material, and its primary object is to improve the efficiency of the laminating process for increasing production and lowering the unit cost of foil-coated hides. Further objects and advantages will appear as the following description proceeds.

Foil-coated hides are widely used for ladies' shoes, handbags and accessories. In a conventional process, hides are laminated with foil by first coating the hide with a heat- and/or pressure-sensitive adhesive, and then laying over the hide a sheet of foil of sufficient size to cover the hide completely. The hide is placed on the bed of a press, followed by the foil, and the sandwiched materials are compressed by a die to perfect the bond. This die may have a surface formed with any desired pattern, for the purpose of embossing the leather surface with a textured or smooth surface, as desired. After compression by the embossing die, the cemented sandwich is removed from the press, and the hide is manually pulled away from the foil sheet to tear out that area of the foil which is cemented to the hide. The cut-out waste foil sheets and the coated hides must then be stacked manually. This process affords a slow rate of production, because of the necessary manual operations of laying up the hides on the press, overlaying the foil sheets so that the entire surfaces of the hides are covered, and tearing out and stacking the coated hides and the foil waste.

In a preferred mode of practice of my improved process, I utilize an indefinite length of foil having a separable backing or lamination of flexible sheet material such as vinyl. The backing is of sufficient thickness to form a self-supporting integral sheet upon removal of the foil. I also utilize an indefinite length of paper or other sheet material as a support for the hides. The laminated foil and the support sheet are reeled on supply rolls, and are fed intermittently in overlapping relation to the embossing press, and thence to separate spaced-apart delivery rolls.

The hides are first sprayed or otherwise coated with a suitable adhesive. A worker then lays each hide successively on the intermittently-advancing paper support sheet. Each hide is allowed to dwell in the press as the embossing die presses it against the foil laminate sheet. The embossing process causes only that portion of the foil which contacts a hide to adhere. As the sandwiched sheets emerge from the press, I cause the foil laminate and paper support sheets to diverge, by appropriate spacing of the delivery rolls. Consequently, those portions of the foil sheet which contact hides are automatically torn away from the body of the foil laminate sheet by the weight of the hides, and are carried away with the hides upon the paper support sheet. The remaining waste foil adheres to its backing sheet, and is rolled up on a delivery roll for later recovery. The foil-coated hides are manually removed from the paper support sheet as it emerges from the press, and stacked for further processing.

As my improved process does not require the laying up of separate sheets of foil on individual hides, or the manual removal of the foil waste from the hides, it requires but two operators. One of these lays up the hides on the paper support sheet, and the other removes the coated hides from the support sheet and stacks them. The foil-backing and paper sheets are generally recoverable and re-usable. The reduction in the manipulations required allows the process to be carried on at a substantially increased rate. Furthermore, the avoidance of the need to align foil sheets correctly with individual hides results in a lower rate of rejection of completed hides.

In a modification of the process, the paper support sheet is extended a sufficiently great distance upstream from the press, by appropriate placement of the supply roll, to allow the adhesive to be applied by brushing or spraying after the hides are laid upon the paper. A heat-setting adhesive can be prewarmed for proper adherence to the foil by heating elements or lamps positioned over the paper support in its run toward the press.

While the specification concludes with claims particularly pointing out the subject matter which I regard as my invention, it is believed that a clearer understanding may be gained from the following detailed description of preferred modes of practice, reference being had to the accompanying drawing, in which:

Figure 1:
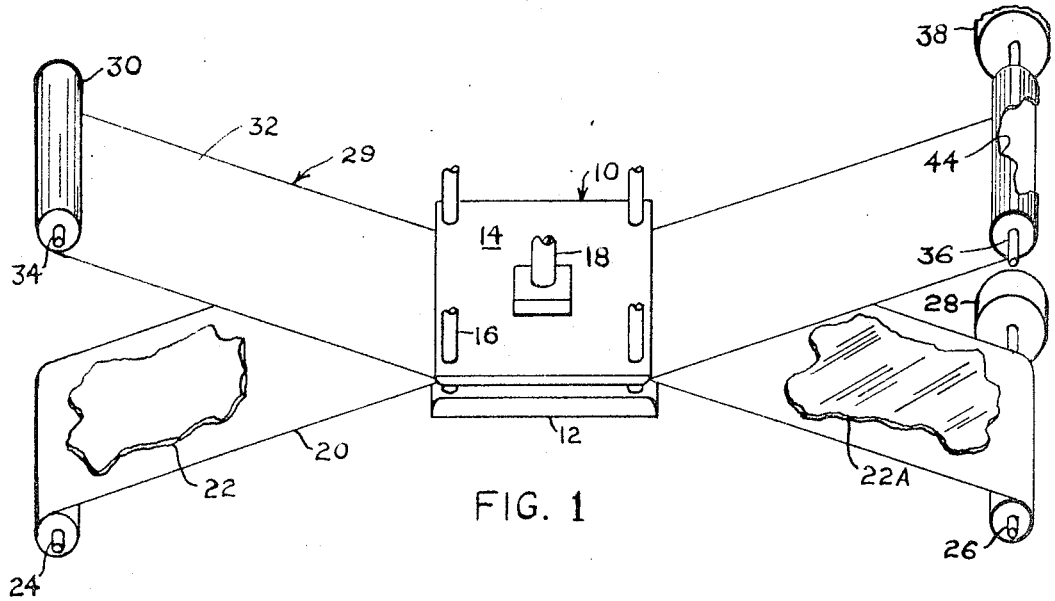
FIGURE 1 is a pictorial view showing a preferred mode of practice of the improved method.
Figure 2:
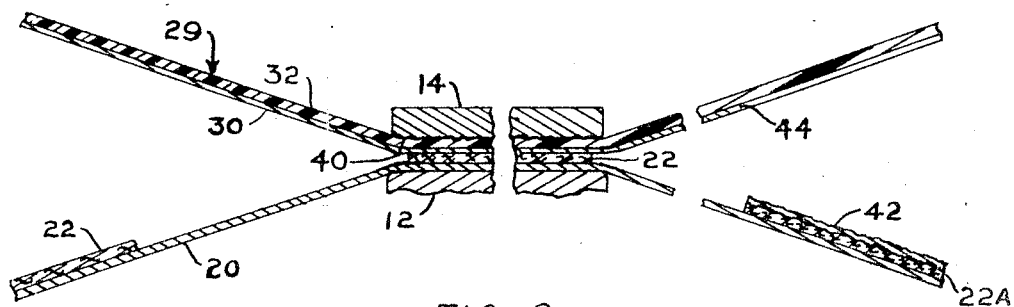
FIGURE 2 is a cross-sectional view in side elevation and on an enlarged scale, more clearly showing the elements involved in the process.

Referring to FIGURES 1 and 2, the improved process is carried out in conjunction with a press 10 having a stationary press element or bed 12, and a movable press element or die 14; the latter element is slidable upon guide posts 16 by means of an actuating rod 18 driven by suitable motive means (not shown). This press is merely illustrative, and any pressing means may be employed which are suitable for perfecting the adhesive bond. Heating means may be provided for use in conjunction with heat-setting adhesives, appropriate to heat the press element 14 to the required temperature.

An indefinite length of support sheet 20, which may be of paper, is employed for carrying a series of hides 22 through the press. This sheet is supplied by a roll 24, rotatably mounted in a suitable stand (not shown). A delivery roll 26 is arranged to be driven intermittently by motive means such as the illustrated electric motor 28, to draw the paper support sheet through the press and reroll it for further use. An operator is stationed adjacent to the roll 24 to lay hides successively on the support sheet; he may then coat the exposed surface of each hide with cement, or this may have been performed in a previous operation, depending upon the nature of the cement which is chosen.

An indefinite length of laminate sheet 29, comprising foil 30 and a backing sheet 32, which may be of vinyl, is supplied by a roll 34. The roll 34 is rotatably mounted in a suitable stand (not shown) in spaced-apart relation above the roll 24. This spacing allows a sufficient gap to exit between the laminate sheet and the support sheet to permit the hides to conveniently be placed on the latter. The adherence of the moil 30 to the backing 32 is sufficiently strong to secure the laminate against accidental separation, and to retain the waste foil in place when the foil adhering to the hides is torn away; however, the adhering foil must be separable from the backing by the weight of the hides.

The sheets 29 and 20 converge toward the bed 12 of the press, and then diverge, the laminate sheet being wound on a delivery roll 36 which is driven by suitable motive means such as an electric motor 38. The rolls 26 and 36 are rotatably mounted in spaced-apart relation in a suitable stand (not shown). The press actuator 18 is suitably controlled either manually or automatically to actuate the press at intervals, when the rolls are stationary and a hide 22 is positioned on the press bed. As the press is re-opened, the motors 28 and 38 are energized to wind the rolls 26 and 36 to deliver a foil-coated hide 22A for removal by a second operator, who stacks them for further processing. The motors are stopped as the next hide arrives in position in the press.

The surface 40 of the press member or die 14 may be textured as desired to emboss a pattern on the surface of the foil and the underlying hide, as illustrated at 42 on the surface of the finished hide 22A. If a smooth finish is desired, the press member may have a sand-blasted surface, according to well-known practice. Subsequent to operation of the press to adhere the foil to the hide and emboss the surface as desired, the press is re-opened and the rolls 36 and 26 are advanced in unison. As the coated hide emerges from the press and the sheets 20 and 32 diverge, the portion of the foil which is adhered to a hide tears away from the body of the sheet 30, leaving a gap 44. The waste foil may later be recovered by separation from the backing sheet 32.

Figure 3:
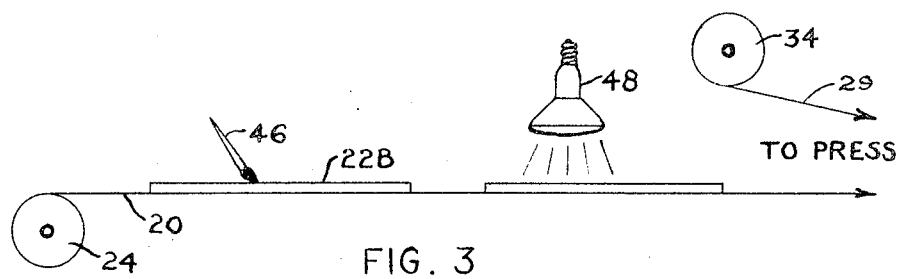
FIGURE 3 is a fragmentary schematic view showing a modification of the process.

A modification of the process shown in FIGURE 3 spaces the roll 24 some distance upstream from the roll 34 so that a hide in position 22B may be conveniently coated with adhesive by means of a brush 46, or by spraying. This arrangement also provides space to preheat adhesives of appropriate air-drying types, by means such as a heat lamp 48 positioned over the roll of the support sheet 20. The process is otherwise similar to that previously described.

It will be understood from the foregoing description that my improved process obviates the need to lay up separate loose sheets of foil on individual hides, to align the individual hides on the press bed, or to manually tear away the waste portions of the foil sheets from the finished hides. The time required for processing each hide is correspondingly reduced, and increased production, is secured. Furthermore, the minimum number of workers required is reduced from three to two. Further, the opportunity for human error is reduced and the rate of rejection of improperly laminated hides is correspondingly decreased.

While I have described preferred embodiments of my improved process for laminating hides with foil by way of illustration, it will be apparent to those skilled in the art that various changes and modifications may be made therein without departing from the true spirit and scope of the invention.

What I claim is:

1. A process for simultaneously applying a foil to, and embossing, hides, by means of separable combined pressing and embossing elements, which comprises the steps of: extending a first carrier web of indefinite length between the pressing elements, extending a second carrier web of indefinite length between the pressing elements in overlying relation to the first web, the second web being a laminate sheet comprising foil and backing sheets, said foil facing toward the first web, adhesive-coating and laying said hides successively upon the first web, advancing the first web and the second web intermittently and in unison to position successive hides and fresh foil sheet between the pressing and embossing elements, operating said elements to adhere portions of the foil sheet to succesive adhesive-coated hides while simultaneously embossing the foil-coated surfaces of the hides, separating said elements, and advancing said webs and embossed foil-coated hides out of said elements along diverging paths to cause the portions of the foil sheet adhered to the hides to tear away from the body of the foil sheet as the hides diverge from the second web while the remaining portions of the foil sheet remain laminated with said second web.

2. The process recited in claim 1, together with the additional preliminary steps of reeling said first and second webs for feeding to the pressing and embossing elements, and the additional subsequent steps of re-reeling said first web for re-use and re-reeling said second web for recovery of the remaining portion of said foil sheet and said backing sheet.

3. The process recited in claim 1, in which the steps of extending the first and second webs to the pressing and embossing elements are carried out along spaced-apart paths converging toward said elements.

4. The process recited in claim 1, in which the steps of adhesive-coating the hides is performed subsequent to laying the hides on said first web, concurrently with the step of advancing the first web and hides laid thereon to the pressing and embossing elements.

5. The process recited in claim 1, together with the additional step of pre-heating the adhesive coating of successive hides concurrently with the step of advancing the first web and hides laid thereon to the pressing and embossing elements.

References Cited

UNITED STATES PATENTS

| | | | |
|---|---|---|---|
| 2,029,377 | 2/1936 | Kaplan | 156—241 XR |
| 2,644,262 | 7/1953 | Schoenberg et al. | 156—233 |
| 3,080,270 | 3/1963 | Lorenz | 156—233 |

EARL M. BERGERT, Primary Examiner

J. D. SMITH, Assistant Examiner

U.S. Cl. X.R.

156—234, 241